July 18, 1950     G. K. VAN LANGEN     2,515,575

TRAILER HANDLING DEVICE

Filed Oct. 13, 1947     3 Sheets-Sheet 1

INVENTOR
GERRIT K. VAN LANGEN
BY Liverance and Van Antwerp
ATTORNEYS

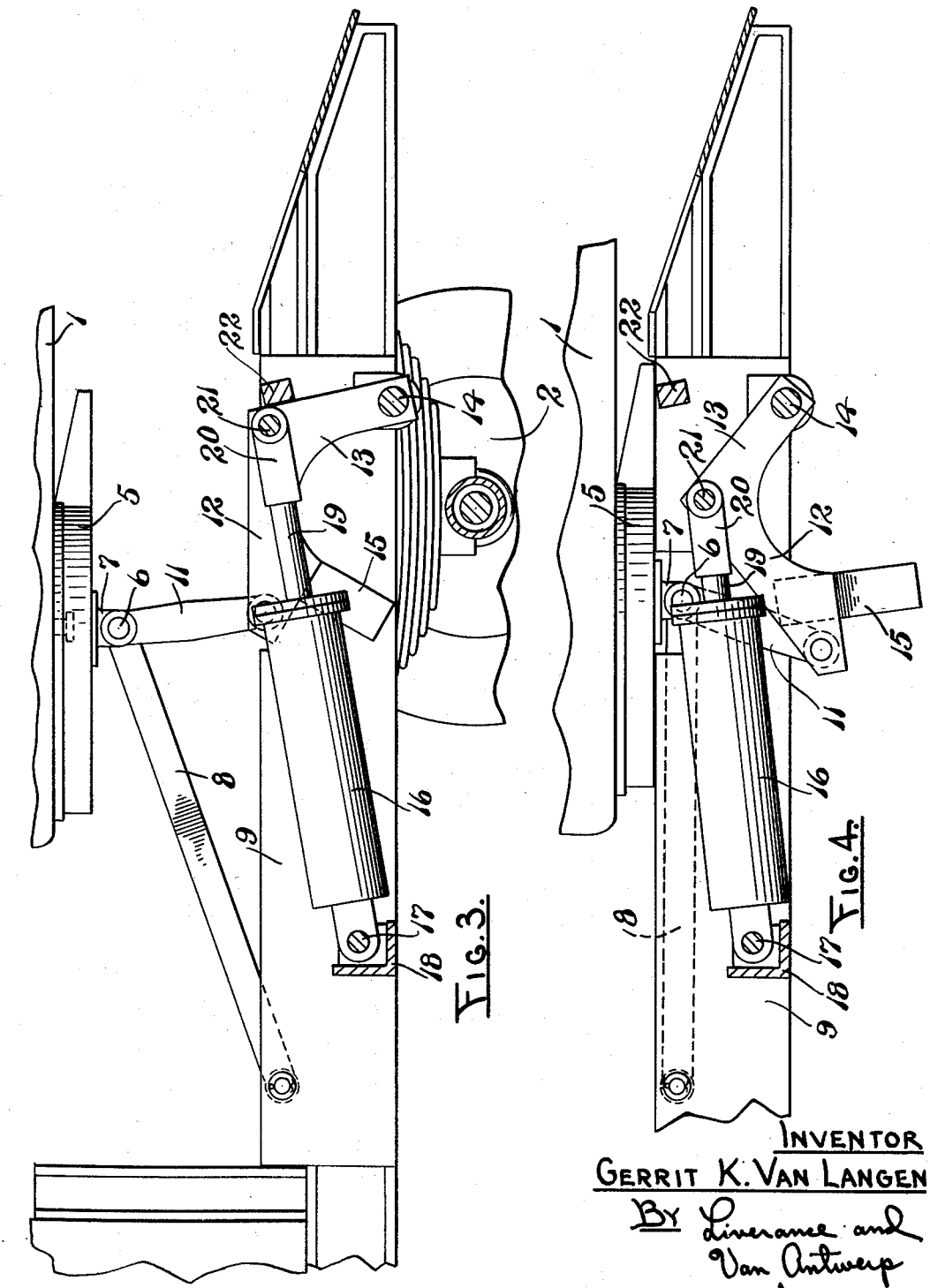

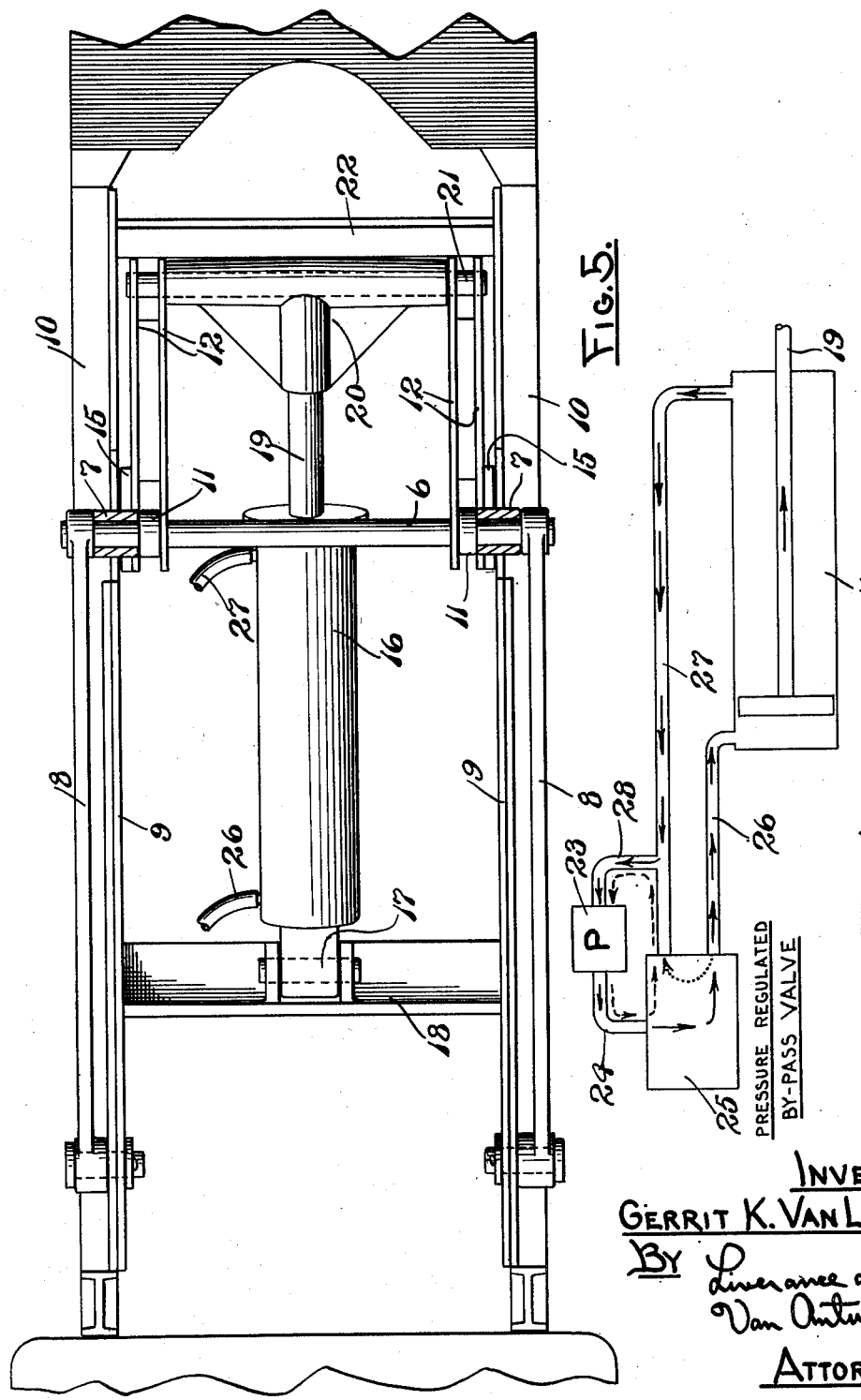

Patented July 18, 1950

2,515,575

UNITED STATES PATENT OFFICE 2,515,575

TRAILER HANDLING DEVICE

Gerrit K. Van Langen, Grand Rapids, Mich.

Application October 13, 1947, Serial No. 779,426

4 Claims. (Cl. 280—33.05)

This invention relates to a trailer handling device or apparatus for use primarily in handling large trailers which are drawn by trucks or tractors. Trailers of the type noted, in general are connected at their front portions by a detachable coupling to a fifth wheel structure which is mounted at the rear upper portion of the pulling tractor or truck. A rear axle with wheels is used at the rear of the trailer for movement over roads and when connected with the pulling tractor or truck, no other support is needed. On disconnecting from the fifth-wheel structure, it is common to lower a front support below the body of the trailer toward the front thereof, to hold said front end of the trailer in an upper position so that the body is substantially horizontal.

In the handling of trailers at a terminal or a loading dock, the trailer may be properly located with respect to the dock, but at such place receive part only of a load. During the loading the tractor or truck is disconnected and the trailer supported at the front by the downwardly extended front supports. Frequently the trailer must be moved to other positions, either at the same or at other loading docks, or perhaps to another part of a city to complete the load. There are also occasions when the trailer must be moved for putting another trailer at the place which it has occupied. Such connecting and disconnecting with the pulling tractor or truck may require the raising of the front supports and a subsequent lowering thereof many times before a full load is taken on and the trailer drawn from one city, for example, to another, many miles or hundreds of miles away.

With the present invention a novel, practical and very effective means is provided for vertical adjustment of the fifth wheel carried by the tractor or truck, so that it may be lowered to its normal position which it occupies when the trailer is being drawn long distances, but may be elevated a sufficient distance to lift the trailer front supports above the road, and held in such position while the short haul or short distance movements or changes of position of the trailer take place. This eliminates the necessity of frequent raising and lowering of the trailer front supports, with a saving of time and consequent economy in operation.

Figure 1:
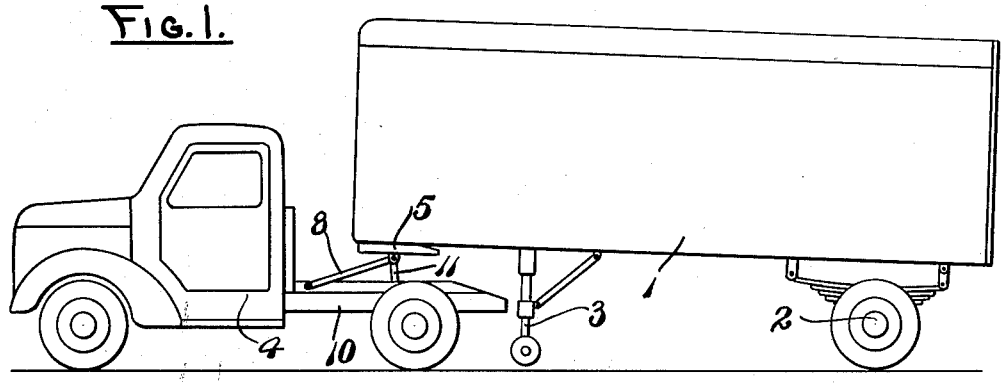
Figure 2:
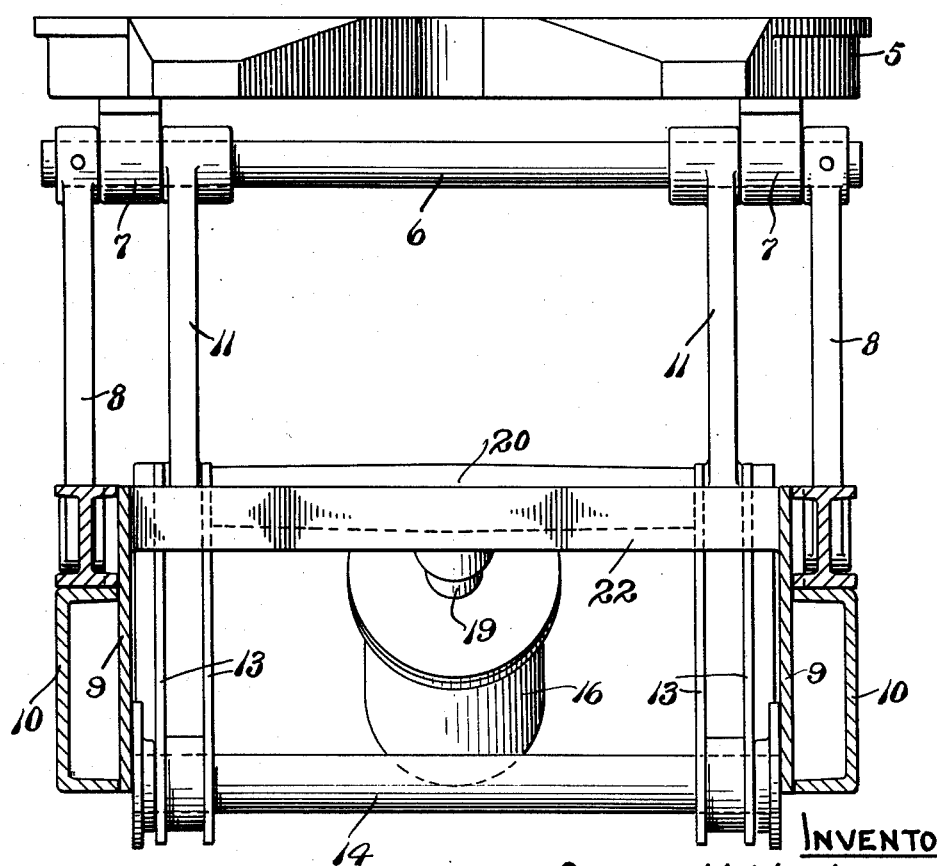

My invention for accomplishing the ends stated may be understood from the following description, taken in connection with the accompanying drawings, in which Fig. 1 is a side elevation showing a trailer connected with a pulling truck and with the fifth wheel of the truck in its elevated position, Fig. 2 is an enlarged transverse vertical section through the rear portion of the truck and back of the elevated fifth wheel looking in a forward direction thereagainst, Fig. 3 is a longitudinal vertical section and side elevation through the rear portion of the truck with the fifth wheel elevated, Fig. 4 is a fragmentary similar view showing the fifth wheel in its lower position, Fig. 5 is a plan view of the elevating structure for the fifth wheel, and Fig. 6 is a diagrammatic representation of the hydraulic operating means for elevating the trailer and maintaining it in its upper position against lowering during short haul movement.

Like reference characters refer to like parts in the different figures of the drawings.

The trailer body 1, supported at its rear by rear axle and wheels 2, is equipped with retractable front supports 3 of a well known and conventional structure which may be raised and lowered. The pulling tractor or truck 4 is adapted to be backed under the bottom of the front end of the trailer body 1 and a detachable connection made with a fifth wheel, indicated at 5. In long hauls the retractable front supports 3 are raised and the front end of the trailer is supported by the rear end of the truck and is drawn through its connection made at the fifth wheel.

In my invention, the fifth wheel is tiltably mounted upon a horizontal rod 6 by means of suitable sleeve or bracket connections 7 through which the rod extends. The fifth wheel 5 thus may have a limited pivotal movement about the horizontal axis of the rod 6. Two bars 8, one at each end of the rod 6, extend therefrom forwardly and are pivotally connected at their front ends to vertical plates 9, which are secured at the inner sides of the chassis side frame members 10 of the truck.

Other bars or links 11 are mounted one at each end on the rod 6, said rod passing therethrough, and extend to and are pivotally connected at their other ends to bell cranks having arms 12 and 13, generally located at right angles to each other. The bell cranks are each made of two spaced apart flat plates, between which at the forward end of the arms 12 thereof, the other ends of the links 11 are located, with a rod extending through said arms and the links to provide the pivotal connection. The ends of the arms 13 are pivotally connected to a crossrod 14, which extends between the plates 9 and are mounted in brackets shown in Fig. 2 welded or otherwise permanently secured to the plates.

It is evident that by turning the bell crank levers about the rod 14 from a position shown in Fig. 4 to that shown in Fig. 3, the fifth wheel may be elevated, and on turning in the opposite direction, the fifth wheel may be lowered, as shown in such figures. In such movement the arms 12 of the bell cranks are held against lateral displacement by bearing plates 15 connected at the outer sides thereof, which are in close proximity to the inner sides of the plates 9, thus forming a guide for the movements of the bell cranks from one position to the other.

A hydraulic cylinder 16 is located between the chassis side frame members in a generally horizontal position, and at its front end, through a lug connected thereto, is pivotally mounted upon a pin 17 (Fig. 5) supported by a transverse bar 18 extending between the chassis side frame members 10. The cylinder has a piston therein (Fig. 6) from which a piston rod 19 extends. At its outer end the rod 19 is connected with a head 20 through which a horizontal rod 21 extends and which, at its ends, is rotatably mounted in connection with the bell crank levers described, substantially at the juncture of the arms 12 and 13 (Fig. 3).

When fluid under pressure is pumped or otherwise forced into the front end of the cylinder 16, the piston rod 19 is moved to the rear and turns the bell crank levers in a clockwise direction from the position shown in Fig. 4 to that in Fig. 3. The movement may continue until the upper end portions of the arms 13 are stopped by coming against a crossbar 22 extending between the plates 9 and connected thereto at its ends.

In Fig. 6 a diagrammatic representation of the liquid circuits used is shown. The pump 23, which may be operatively connected and disconnected with the engine motor of the truck in the usual and well known manner, will pump liquid and force it through an outlet pipe 24 to a pressure regulated bypass valve diagrammatically illustrated at 25. From this valve structure a conducting pipe 26 leads to the front end of the cylinder 16. From the rear end of the cylinder a return pipe 27 leads to the pressure regulated bypass valve and has a branch 28 connecting it with the inlet side of the pump 23.

In the pumping, until the pressure of the hydraulic liquid used reaches a predetermined amount, the circuit of the liquid is through the pipe 24, the housing 25 of the bypass valve and pipe 26 to the front end of the cylinder 16. The liquid at the other side of the piston in the cylinder is forced out through the pipe 27 and is lead by the branch pipe 28 to the inlet side of the pump. Upon a predetermined high pressure being obtained, as for example when the bell crank levers come against the stop bar 22, there is a circuit from the pump through pipe 24, the housing 25 and the short length of the pipe 27 from housing 25 to the branch pipe 28, with a return of the liquid to the inlet side of the pump, and no circulation of liquid in the pipes 26 and 27 in the manner first described.

When a trailer is placed at a loading dock or other place where it is to receive a load or is to be unloaded, the front supports 3 are lowered and the tractor or truck disconnected. If, as frequently occurs, the trailer is to be moved after it is either partly loaded or partly unloaded, the truck is backed under the front end of the trailer and the fifth wheel, after connection with the trailer, is lifted from the lower position in Fig. 4 to that in Fig. 3. This elevates the lower ends, or the wheels carried at the lower ends of the front supports, a distance above the road, and the trailer may be drawn to another place or position. The fifth wheel is maintained in its upper position by the pressure of the pumped liquid, which may be maintained consistent at all times while the front end of the trailer is elevated by a lifting of the fifth wheel 5 in the manner described. No gradual lowering of the trailer occurs, but it is held in its upper position at all times that the fifth wheel is lifted. If the fifth wheel is not lifted to its uppermost position, but to an intermediate position between the upper and lower positions, and the pump stopped, no circulation of the hydraulic liquid used will occur.

The structure described has proved very practical and useful and is in steady practical operation.

The invention is defined in the appended claims and is to be considered comprehensive of all forms of structure coming within their scope.

I claim:

1. In a structure as described, a truck or tractor chassis frame, a fifth wheel located above the rear portion thereof, a horizontal crossrod to which the wheel is connected and above which it is located, bars pivotally connected at their rear ends with said crossbar and extending forwardly and having pivotal connection to the chassis frame, other bars pivotally connected to said crossrod located at an angle to the first mentioned bars, bell cranks pivotally mounted on said chassis frame having generally forwardly extending arms, and arms extending generally downward therefrom, means pivotally connecting said second mentioned bars at their other ends to the forwardly extending arms of said bell crank levers, hydraulic means for moving said bell crank levers about their pivotal mountings, a transverse horizontal stop bar carried by said chassis frame back of the bell crank levers against which said levers engage on elevation of the fifth wheel to its uppermost position, and bypass means included in said hydraulic means for interrupting further operation of the hydraulic means to turn said bell crank levers upon such engagement.

2. A structure as defined in claim 1, a hydraulic pump and a piston cylinder structure included in said hydraulic means with connections between the pump and cylinder, said pump being adapted to pump liquid to the cylinder, and pressure valve bypass means adapted to operate upon attainment of a predetermined pressure of the liquid pumped to direct the liquid pumped from the outlet back to the inlet side of the pump without passage to said cylinder, and maintain the pressure of liquid in said cylinder at said predetermined amount.

3. In a structure of the class described, a truck or tractor chassis frame, a fifth wheel located above the frame, means movably connecting said fifth wheel to the frame, hydraulic operated means connected with said last mentioned means for moving it to raise and lower said fifth wheel, said hydraulic actuated means including bell crank levers pivotally mounted at one end and having pivotal connection to said fifth wheel elevating means at the other, a hydraulic cylinder, means to supply said cylinder with fluid under pressure at one end, a piston within the cylinder, a piston rod extending from the piston at the opposite end of the cylinder, pivotal connections between said piston rod and said bell crank levers between the ends thereof, and a transverse bar mounted on said chassis frame in the path of movement of said bell crank levers to stop such movement upon said levers coming thereagainst.

4. A construction as defined in claim 3, and hydraulic pumping means connected with said cylinder, having connections leading therefrom to opposite ends of the cylinder, and a pressure regulated bypass valve connected with both of said connections, the connection from the rear end of the cylinder having a branch connection leading to the inlet side of the pump.

GERRIT K. VAN LANGEN.

REFERENCES CITED

The following references are of record in the file of this patent:

UNITED STATES PATENTS

| Number | Name | Date |
|---|---|---|
| 1,467,209 | Sumner | Sept. 4, 1923 |
| 1,908,987 | Kuhlman | May 16, 1933 |
| 2,407,447 | Pollard | Sept. 10, 1946 |